May 19, 1964

L. L. MYERS 3,133,471

FLUID CONTROL SYSTEM AND APPARATUS

Filed May 23, 1962

Inventor:
Lester L. Myers,
by Hood, Gust & Irish
Attorneys.

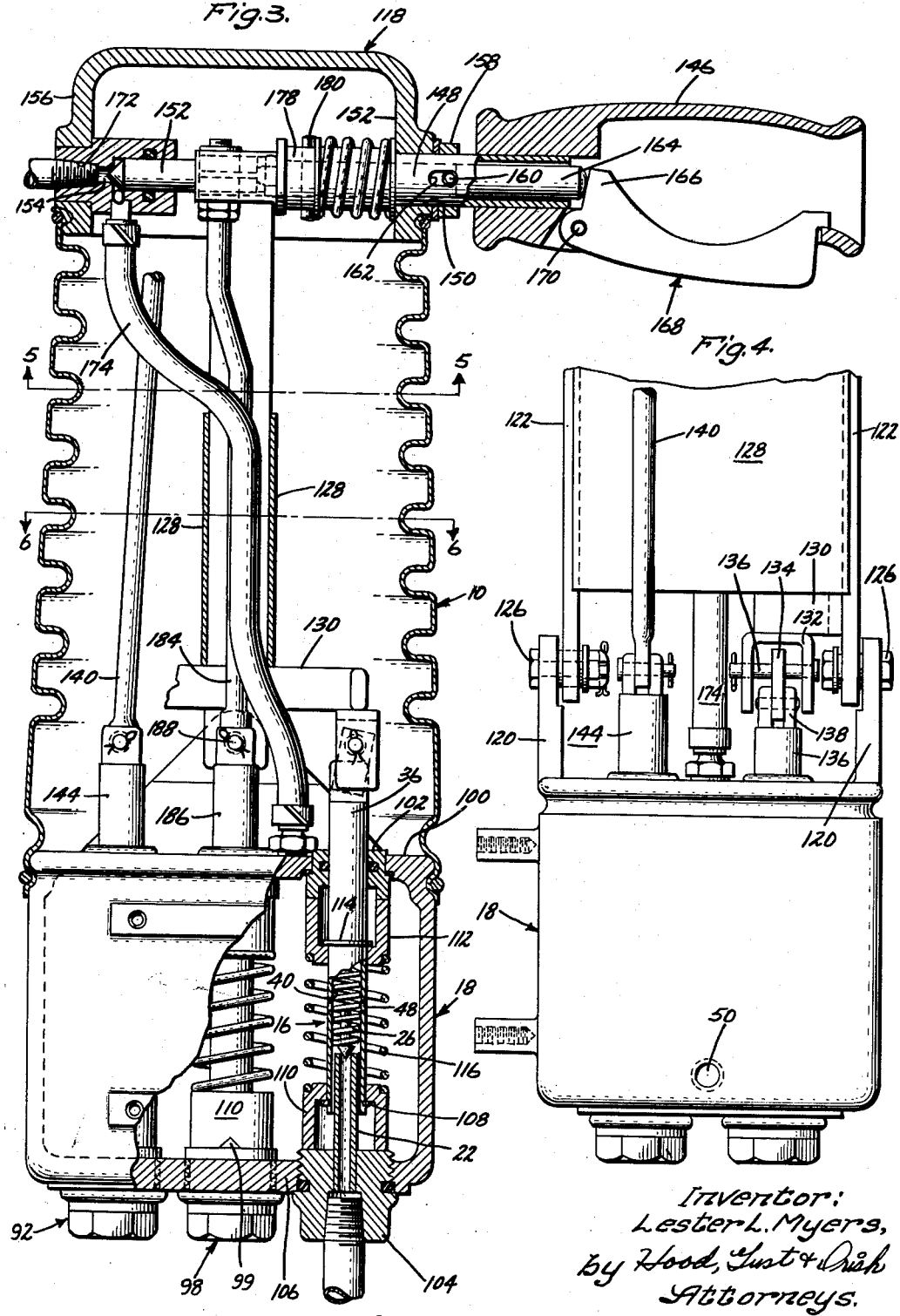

May 19, 1964 L. L. MYERS 3,133,471
FLUID CONTROL SYSTEM AND APPARATUS
Filed May 23, 1962 4 Sheets-Sheet 3

Inventor:
Lester L. Myers,
by Hood, Lust & Irish
Attorneys.

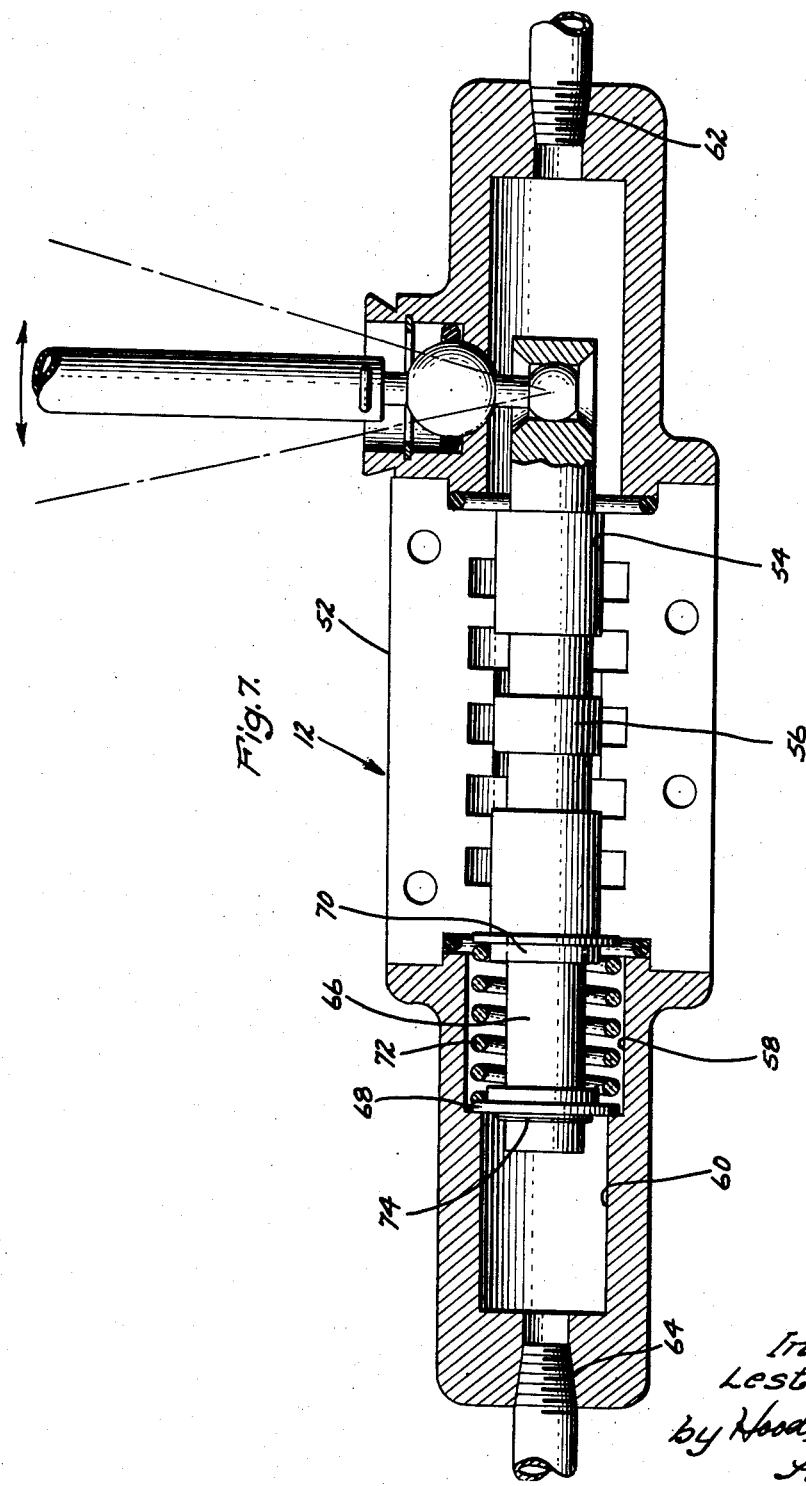

United States Patent Office 3,133,471
Patented May 19, 1964

3,133,471
FLUID CONTROL SYSTEM AND APPARATUS
Lester L. Myers, Fort Wayne, Ind., assignor to Mobile Aerial Towers, Inc., Fort Wayne, Ind.
Filed May 23, 1962, Ser. No. 197,027
10 Claims. (Cl. 91—51)

The present invention relates to a fluid control system and apparatus and more particularly to a control system for use in controlling the operation of mobile aerial towers.

Mobile aerial towers conventionally comprise a pair of elongated boom-like members which are pivoted or articulated together at one end such that the members can swing toward and away from each other in a common plane. The distal end of one of the members is pivotally mounted upon a mobile platform while the corresponding end of the other member pivotally carries a suitable supporting structure or basket in which the operator rides. The platform is adapted to be rotated in a horizontal plane, and the pivotal connections are horizontally aligned. Three hydraulic or the like motors are generally used for effecting three different movements of the tower, one motor being operative to control rotary motion of the platform, another motor being operative to swing the lower boom-like member about its pivotal connection with the platform, and the third motor serving to swing the upper member about its pivotal connection with the lower member.

A hydraulic control system is used to control the operation of the three motors and utilizes a hand-controlled unit in the basket by which an operator can control his movement and position in space within the limits afforded by the tower structure. The present invention is directed to improvements in such a control system.

In prior art control systems, it has been common to use a master cylinder type control unit mounted in the operator's basket and a remote slave cylinder valve unit mounted on the supporting chassis with suitable tubing interconnecting these units. The control unit is manually operated by the operator to produce corresponding operation of the valve unit which in turn controls the operation of the tower.

Since these prior systems are generally operated at atmospheric pressure, air sometimes enters the hydraulic lines thereby interrupting the liquid columns extending between the master and slave units. This tends to occur in towers having relatively long boom members wherein the hydraulic lines are of such length that the columns of liquid therein cannot be supported by atmospheric pressure. This results in air becoming entrained in the hydraulic lines which either prevents or seriously impairs proper operation of the system.

Additionally, these prior systems are subject to the criticism that they require considerable operator effort to operate inasmuch as the power required to operate the slave unit is developed at the master unit by the operator. Also, these prior systems must be kept filled with hydraulic fluid such that if minor leaks occur with the consequent loss of fluid, the system becomes inoperative.

The present invention constitutes an improvement over the aforementioned prior systems in that it requires less operator effort to operate, eliminates problems of air being entrapped in the lines, and is less sensitive to minor leaks which might occur.

It is therefore an object of this invention to provide an improved hydraulic control system of the character described which requires a minimum of effort to operate, is less susceptible to malfunction than prior systems due to problems of entrapped air, and is relatively insensitive to minor leakage which might occur.

It is another object of this invention to provide an improved hydraulic control system wherein the power for operation is primarily derived from a source of pressure fluid.

It is a further object of this invention to provide an improved hydraulic control system which includes a fluid-pressure responsive member capable of being selectively moved in opposite directions from a neutral position by differential pressure thereover, this differential pressure being incrementally controlled by unique means which is manually operated.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 3 is a front elevation partly sectioned of the hand control unit shown diagrammatically in FIGS. 1 and 2;

FIG. 4 is a fragmentary side elevation of the unit of FIG. 3 rotated 90°;

FIG. 7 is an axial sectional illustration of the control valve which is shown diagrammatically in FIGS. 1 and 2.

Figure 1:
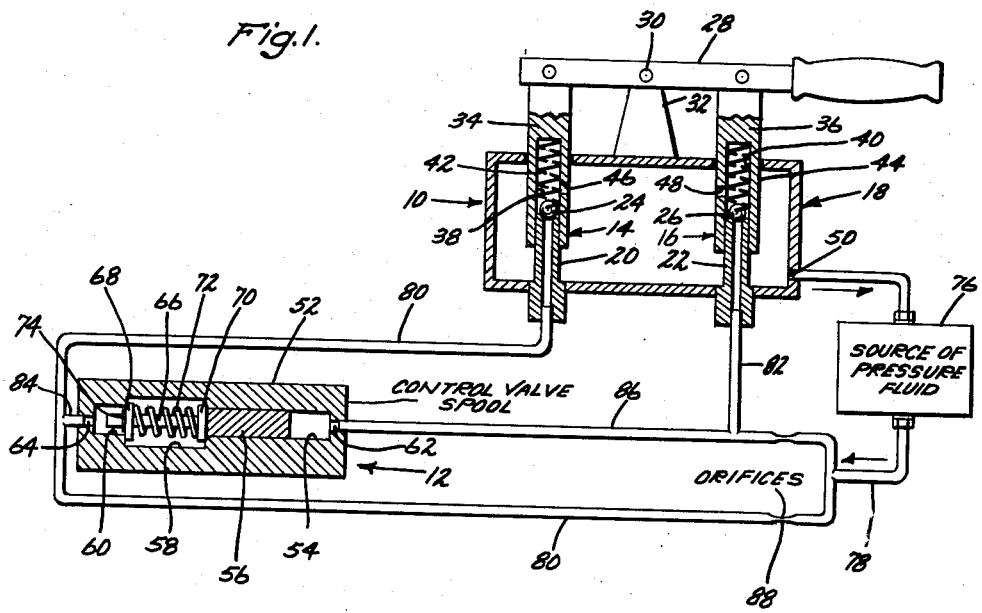
FIGS. 1 and 2 are diagrammatic illustrations of one embodiment of this invention shown in two different positions of operation.

Referring to the drawings, a hand control unit generally indicated by the reference numeral 10 is adapted to be mounted in the basket of a mobile aerial tower at a location which is conveniently accessible to a workman riding in the basket, and a control valve generally indicated by the reference numeral 12 is adapted to be mounted on the chassis or truck which carries the tower at a location which is remote from the hand control unit 10. Typical mobile aerial towers and systems for operating them are disclosed and claimed in my prior Patents Nos. 2,836,467 and 2,946,196; a typical hydraulic power system for operating such a tower is shown in FIG. 7 of my aforesaid Patent 2,836,467, and as will appear from the following description, the present invention may be incorporated in such system for controlling the various movements of the tower.

Referring to FIG. 1, the control unit 10 comprises two relief valve assemblies generally indicated by the reference numerals 14 and 16, respectively, which may be identically constructed. These valves are operatively mounted on a frame or reservoir generally indicated by the numeral 18 and include upstanding tubular elements 20 and 22 which are secured to the bottom of the reservoir 18 as shown. Seated in sealing engagement with the upper ends of these two tubular elements 20 and 22 are two valve members 24 and 26, respectively, which are adapted to seal off the flow of fluid through the elements 20 and 22.

Mounted on the upper side of the reservoir 18 is a common lever 28 pivoted at 30 intermediate its ends on an upstanding support 32 which is secured to the reservoir. Pivotally connected to the two arms of the lever 28 are two elongated actuating members 34 and 36, respectively, which are provided with coaxial sockets 38 and 40 telescoped over the respective tubular elements 20 and 22 as shown. These two sockets receive helical compression springs 42 and 44, respectively, which bear at one end against the bottom of the respective socket and at the other end against the respective valve members 24, 26, urging the latter into sealing engagement with the open end of the respective tubular elements 20, 22.

Preferably, the springs 40 and 42 exert equal forces on the respective valve members 24, 26 such that the handle 28 will normally be biased to a neutral position such as the one shown in FIG. 1.

The two actuating members 34 and 36 are provided with apertures 46 and 48, respectively, which provide communication between the respective sockets 38 and 40 and the interior of the reservoir 18. The reservoir 18 is provided with an outlet 50 which is connected into the total system in a manner to be described in more detail hereinafter.

The control valve 12 generally comprises a body 52 having a bore 54 which receives for reciprocation a valve spool 56. A slightly larger diameter bore 58 coaxially extends from the bore 54 and is reduced in diameter at the end 60 thereof. The right-hand end of the body 52 is provided with a port 62 which communicates with the bore 54 while the left-hand end of the body is provided with another port 64 which communicates with the smaller diameter bore 60, the bore portion 58 and the left-hand end of the bore 54.

Figure 2:
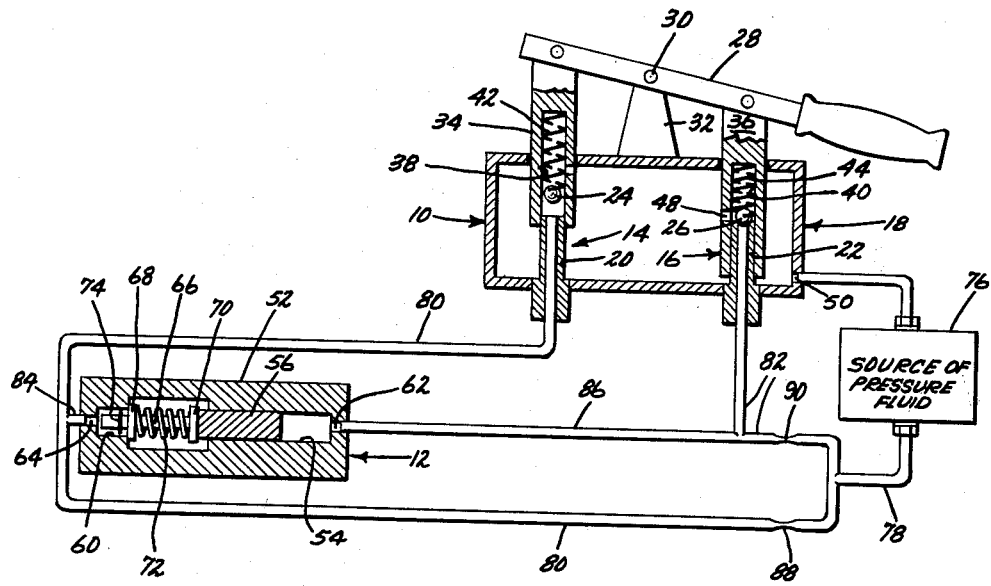

Coaxially extending from the left-hand end of the valve spool 56 is a reduced diameter stem 66 which slidably receives thereon two annular retainers 68 and 70. A helical compression spring 72 surrounds the stem 66 and bears at its opposite ends against the retainers 68 and 70 as shown. As shown in FIG. 2, a snap ring or the like 74 is secured to the left end portion of the stem 66, this snap ring serving as an abutment which engages the annular retainer 68 on the left-hand side. In FIG. 1, this snap ring 74 is abutted against the left-hand side of the retainer 68.

The retainer 70 is engageable with the left-hand end of the spool 56 as more clearly shown in FIG. 2 and is also engageable with the annular shoulder between the two bores 54 and 58 as more clearly shown in FIG. 1. When the valve spool 56 is moved toward the left, as shown in FIG. 2, the retainer 70 moves therewith and compresses the spring 72 against the retainer 68 which abuts the annular shoulder between the two bore portions 58 and 60. Conversely, when the spool 56 is moved toward the right from the position illustrated in FIG. 1, the retainer 68 will be moved toward the right by the snap ring 74 and will compress the spring 72 against the retainer 70 which is held against rightward movement by the annular shoulder between the bore portions 54 and 58. It is thus seen that the spring 72 serves to maintain the valve spool 56 centered in the position illustrated in FIG. 1 when no forces are applied to the latter tending to move it one way or the other.

Here to be emphasized is the fact that the centering spring 72 is designed such that its spring rate or force increases with compression thereof such that as the spool 56 is moved to the end of its travel from the position illustrated in FIG. 1, the spring 72 will react with increasing force tending to move the spool 56 in the opposite direction. The particular design of this spring will become apparent from the description given hereinafter.

A suitable source of hydraulic fluid under pressure, such as oil, is indicated by the numeral 76 and may consist of a conventional accumulator or the like. It is illustrated as having an inlet port connected to the outlet 50 of the reservoir 18 and as having an outlet line 78 which branches off into two hydraulic lines 80 and 82 which connect respectively to the tubular elements 20 and 22 of the control unit 10 as shown.

Also, a suitable line 84 connects the line 80 to the port 64 of the control valve, and a similar line 86 connects the line 82 to the port 62 thereof. Two orifices or restrictions 88 and 90 are provided in the two lines 80 and 82, respectively, in the positions shown, these orifices being of such size as to inhibit the flow of pressure fluid through the lines for a purpose which will become apparent from the following description.

In a typical working system, the source 76 may deliver fluid under constant pressure to the line 78 at, for example, 200 pounds per square inch. The valve springs 42 and 44 of the control unit 10 are designed to bear against the respective valve members 24 and 26 with a force equivalent to, say, 225 pounds per square inch, such that there will be no flow through the fluid lines 80 and 82 when the system is in its neutral position as shown in FIG. 1. If it is desired to move the valve spool 56 toward the left, the operating handle 28 is swung clockwise as shown in FIG. 2 which serves to relax the force exerted by the valve spring 42 on its valve member 24 but conversely increases the force of the valve spring 44 as exerted on its valve member 26. If the force exerted by the valve spring 42 on its valve member is relaxed to a value corresponding to 190 pounds per square inch against the valve member 24, it is thus seen that the source pressure of 200 pounds will unseat this valve member 24 allowing fluid to flow therepast and into the reservoir 18 from which it passes out of the port 50 and back to the source 76. In this example, no liquid flows through the line 82, but limited flow does flow through the line 80 by reason of the restricting orifice 88. This results in a pressure drop in the line 80 on the left-hand side of the restricting orifice 88, which pressure drop is communicated to the left-hand end of the valve spool 56. By the same token, the full source pressure of 200 pounds per square inch is coupled to the right-hand end of the valve spool 56, the net result being a differential pressure between the opposite spool ends which moves the valve spool toward the left. This movement toward the left will continue until the reacting force of the centering spring 72 builds to a value which just offsets the differential pressure over the valve spool at which time the spool stops in its leftward movement. FIG. 2 is illustrative of this condition. From this it will be seeen that moving the control handle 28 a given distance will result in movement of the valve spool 56 a corresponding distance.

Now if it is assumed that greater leftward movement of the valve spool 56 is desired, it is only necessary to move the operating handle 28 clockwise by another increment, whereupon greater flow of liquid past the valve member 24 will occur thereby in turn further reducing the pressure in line 80 between the restricting orifice 88 and the control unit 10. This further reduction in pressure causes a greater pressure differential over the valve spool 56, causing it to move leftward further to a point at which the centering spring 72 reacts with an equal and opposite force just balancing this differential pressure.

While leftward movement only of the valve spool 56 has thus far been explained, it will now appear obvious that if the operating handle 28 is shifted counterclockwise from the neutral position of FIG. 1 by a small increment, the valve member 24 will be sealed off but the spring force on the valve member 26 will be relaxed sufficiently to allow fluid to flow in the line 82. By reason of the presence of the restricting orifice 90, a pressure drop occurs on the right-hand side of the valve spool 56, the pressure on the left-hand end of the spool remaining at source value. This results in the spool being moved toward the right a distance which will be balanced by the centering spring 72.

From the explanation thus far given, it will now be apparent that by operation of the control handle 28, the precise position, in either direction, of the valve spool 56 may be controlled.

In an operating embodiment of this invention wherein the system just described is used in conjunction with the operation of a mobile aerial tower, the valve spool 56 (which is shown in greater detail in FIG. 7) serves in controlling the admission of pressure fluid to a particular hydraulic motor in the tower for controlling the movement of the same, a further example of the valve spool 56 construction and operation being shown in my Patent No. 2,836,467.

The travel of the control handle 28, the design of the valve springs 42 and 44, as well as the design of the centering spring 72, are so related that when the control handle 28 is moved to its extreme clockwise position, the valve spool 56 will be moved to its extreme leftward position, and for extreme counterclockwise movement of the control handle 28, the valve spool 56 will be moved to its extreme rightward position. Thus, it is possible to control the position of the valve spool 56 at any point within its extreme leftward and rightward positions by corresponding operation of the control handle 28.

As explained earlier, a typical mobile tower installation utilizes three different hydraulic motors which must be individually operated either alternatively or simultaneously in connection with movement of the operator to a desired spatial position, and in this connection my Patent No. 2,836,467 discloses such a typical tower installation as well as the hydraulic system for operating the same. As one aspect of the present invention, it is desirable to be able to operate these three motors from a single control handle, and in FIGS. 3 through 6, a practical control unit for achieving this desired objective is illustrated.

Referring now to these FIGS. 3-6, like numerals will indicate like parts. Instead of only two valve assemblies 14 and 16, the control unit of these FIGS. 3-6 utilizes three pairs of such valve assemblies, the first pair being indicated by the numerals 14 and 16, the second by the numerals 92 and 94, and the third pair by the numerals 96 and 98, respectively. These valve assemblies are arranged in the particular substantially parallel pattern shown in FIGS. 3 and 6, and in a complete hydraulic system incorporating these valve assemblies, each pair of valve assemblies has an individual control valve 12 used in conjunction therewith.

Since the valve assemblies are of identical construction, a description of one will suffice for all.

Referring more particularly to FIG. 3, the cover 100 of the reservoir 18 has an annular guide 102 press-fitted therein which reciprocably receives the valve plunger 36. An O-ring seal is preferably used in the annular guide 102 to prevent the leakage of hydraulic fluid past the plunger 36.

The tubular element 22 is press-fitted into or otherwise secured to a conduit fitting 104 which is threaded through the bottom 106 of the reservoir 18, suitable O-ring seals being used to prevent leakage of hydraulic fluid therepast. The socket portion 40 of the plunger 36 is telescoped over the tubular element 22 as shown with a slight clearance preferably being provided therebetween. The tapered valve 26 is normally biased to seal off the upper opened end of the tubular element 22 by the valve spring 44.

On the lower extremity of the valve plunger 36 is secured an abutment ring 108 or the like which is engageable with the underside of a cylindrically shaped spring seat 110 which normally bears against the conduit fitting 104 as shown. The plunger 36 is slidable inside the opening of the spring seat 110 with the abutment ring 108 being engageable with the underside thereof to pick the spring seat 110 up to lift the same off the conduit fitting 104 when the plunger 36 is raised. A port 99 is preferably provided in the lower edge of the seat 110 as shown.

Another spring seat 112 of cylindrical shape loosely surrounds the upper end portion of the plunger 36 as shown and engages the underside of the annular guide 102. A snap or abutment ring 114 is secured to the plunger in the position shown to be engageable with the upper side of the spring seat 112 so as to move the latter downwardly when the plunger 36 is moved downwardly. A compression spring 116 surrounds the plunger 36 and bears at its opposite ends against the two spring seats 110 and 112 as shown to urge the latter toward their illustrated seated positions. The abutment rings 104 and 114 are spaced apart such that when the plunger 36 is in its illustrated neutral position, the rings 108 and 114 are positioned contiguous to the respective sides of the spring seats 110 and 112. Thus, when the plunger 36 is moved downwardly, the spring 116 will urge the latter upwardly through the intermediary of the spring seat 112 and snap ring 114. By the same token, when the plunger 36 is moved upwardly, the spring 116 through the spring seat 110 and snap ring 108 will urge the latter downwardly.

The means for actuating selectively the three pairs of valve assemblies will now be described. A metallic, cup-shaped cap indicated generally by the numeral 118 is pivotally mounted on the reservoir 18 by means of two upstanding lugs 120 which are spaced apart and two spaced-apart, parallel and upstanding links 122 which are preferably made of rigid metallic bar stock. The upper ends of these links 122 are pivotally secured to opposite sides, respectively, of the cap 118 by means of suitable screws 124 while the lower ends of these links 122 are pivotally mounted on the supporting lugs 120 by means of another pair of screws 126, respectively.

Two plates 128 are secured to the two links 122 on opposite sides thereof to insure movement of the links 122 as a unit. A cross-bar 130 is secured intermediate its ends to one of the links 122 such that the opposite ends of this cross-bar 130 engage the upper ends of the plungers 34 and 36. Instead of engaging the upper ends of these plungers directly, a suitable abutment bracket of inverted U-shape as shown in FIG. 4 is pivotally connected to the upper end of the respective plunger 36 by means of a link 134, a pin 136 passing through the link 134 and the two legs of the bracket 132, and another pin 138 pivotally connecting the lower end of the link 134 to the upper end of the plunger 36. The outer extremities of the cross-bar 130 engage the upper sides of the respective brackets 132. Thus, when the links 122 are swung about their pivots 126, one of the plungers 34, 36 will be depressed while the other of the plungers 34, 36 will be elevated under the force of its valve springs 42, 44. Pivotal movement of the links 122 thereby corresponds to the rocking motion of the operating handle 28 of FIGS. 1 and 2 as previously explained.

With respect to the two valve assemblies 92 and 94, they have a pair of rods 140 pivotally connected thereto, the upper ends of these rods 140 being pivotally connected to the depending side of the cap 118 by means of pivot connections 142, these two pivot connections 142 being on opposite sides of one link 122. Thus, as the cap 118 is pivoted about its pivotal connection 124 with the links 122, the links 140 will be alternatively raised and depressed. By connecting the lower ends of these rods 140 to the upper ends of the respective valve plungers 144, opposite movement of these plungers 144 may be effected by the aforementioned tilting movement of the cap 118.

Figure 5:
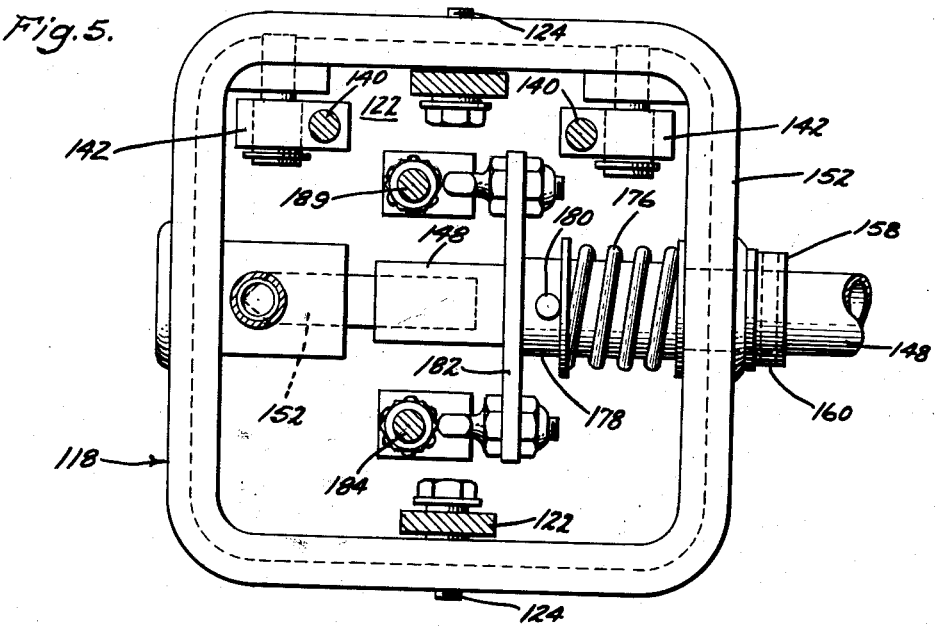
FIG. 5 is a sectional illustration taken substantially along the section line 5—5 of FIG. 3.
Figure 6:
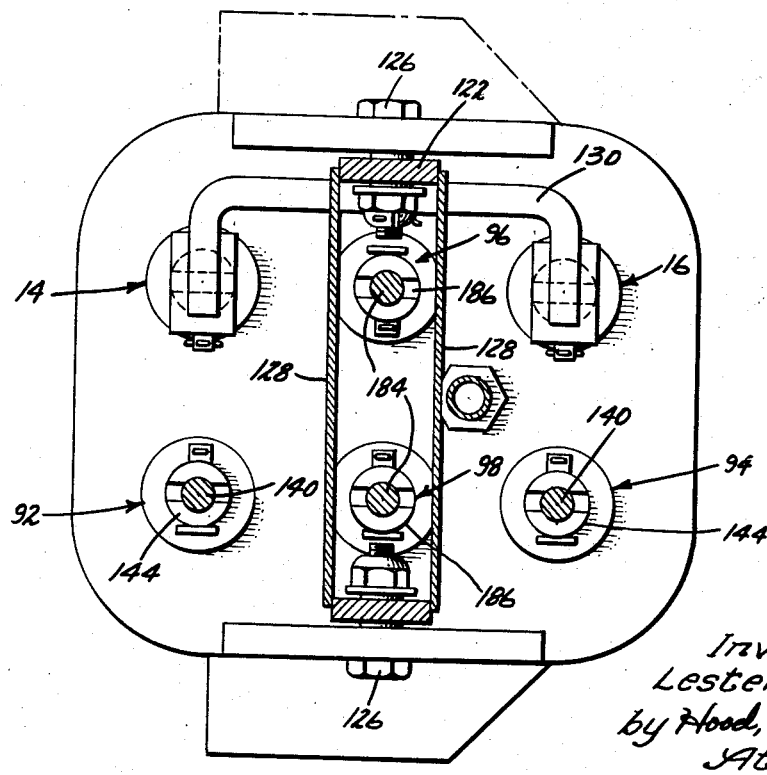
FIG. 6 is a sectional illustration taken substantially along section line 6—6 of FIG. 3.

As shown more clearly in FIGS. 3 and 5, a handle 146 has a tubular shaft 148 rotatably mounted in an opening 150 in the front side 152 of the cap 118. Coaxially extending from the innermost end of the shaft 148 is a valve member 152 which is selectively engageable with a valve seat 154 mounted in the opposite side 156 of the cap 118. Opposite axial movement of the shaft 148 thereby controls the opening and closing of the aperture in the valve 154 seat.

A collar surrounds the shaft 148 and operatively abuts the front side of the cap 152. A pin 160 is snugly received by companion, diametrically opposite openings in the collar 158 and also passes through elongated slots 162 in the opposite sides of the shaft 148. The shaft 148 may thereby be moved axially with respect to the cap 118 by a distance corresponding to the lengths of the slots 162.

Movably received in the hollow portion of the shaft 148 is a solid rod or plunger 164 which is engageable at its left-hand end (FIG. 3) with the middle portion of the pin 160 and at its right-hand end with the arm 166 of a dead man's lever 168 having a pivotal connection 170 with the handle 146. By moving the lever 168 upwardly, it is seen that the plunger 164 is relatively moved toward the left, which results in movement of the handle 146 and the shaft 148 toward the right. When this rightward movement occurs, the valve 152 is lifted off its valve seat 154. This provides for fluid flow between the interior of the reservoir 18 and the valve fitting 172 via the conduit 174 which extends between the valve seat 154 and the reservoir 18.

Normally holding the valve 152 closed is a helical spring 176 which surrounds the shaft 148 and bears against the inner side of the cap flange 152 as shown more clearly in FIGS. 3 and 5. The left-hand end of this spring 176 engages a sleeve 178 surrounding the shaft 148 and which is secured by means of a pin 180 to the shaft 148. By this means, the shaft 148 is constantly urged toward the left as viewed in FIGS. 3 and 5.

Secured to the left-hand end of the sleeve 178 is a lever 182 having its opposite ends pivotally connected to two rods 184, respectively. These rods 184 are pivotally connected at their lower ends to the plungers 186 of the valve assemblies 96 and 98, respectively, by means of suitable pivot pins 188. Thus, by rotating the shaft 148 either one way or the other, the two rods 184 will alternately be raised and lowered respectively, thereby depressing and raising the respective plungers 186.

The various valves 14, 16, 92, 94, 96 and 98 are operated in pairs as follows. If it is desired to operate only the valve assemblies 14 and 16, the handle 146 is moved axially for the purpose of imparting the same motion to the cap 118. This results in swinging movement of the two supporting links 122 which in turn causes the cross-arm 130 to depress and raise the valve plungers 34 and 36 alternately. Similarly, the two valve assemblies 92 and 94 may be actuated by merely depressing or raising the handle 146 which results in pivoting the cap 118 about the pivotal connections 124 with the links 122. The rods 140 are alternately raised and lowered, thereby imparting like motion to the respective plungers 140 of the two valve assemblies 92 and 94.

Lastly, the two valve assemblies 96 and 98 are actuated oppositely merely by rotating the handle 146 which thereby imparts corresponding rocking motion to the lever 182. The rods 184 are moved alternately upwardly and downwardly imparting the same motion to the respective plungers 184 of the two valve assemblies 96 and 98.

If it is desired to actuate all three pairs of valve assemblies simultaneously, it is only necessary to impart to the handle 146 the three individual movements just described.

Each pair of the three pairs of valve assemblies just described are constructed and operated the same as the valve assemblies already described in connection with FIGS. 1 and 2. Therefore, it will not be necessary to explain in further detail the precise operation of the specific valve structures.

In a complete hydraulic system, a control valve 12 (FIGS. 1 and 2) is used in conjunction with each pair of valve assemblies, a more precise arrangement for such a control valve than previously shown and described in connection with FIGS. 1 and 2 being shown in FIG. 7. In this figure, like numerals indicate like parts. This control valve has three ports (not shown) provided in the body 52 thereof which communicate with the different diameter sections of the valve spool 56 for controlling the admission and exhaustion of pressure fluid as needed in connection with operating the hydraulic motors (not shown) in a typical mobile aerial tower installation in which the present invention may be used. A more precise disclosure of the porting in this control valve 12 is given in my prior Patent No. 2,836,467.

As already explained, in the particular system shown in FIGS. 1 and 2, less effort is required to operate the control unit 10 for effecting comparable operation of the control valve 12 than was true in prior art arrangements. Also, since pressure fluid is constantly being supplied to the system, there is less likelihood that air may become entrapped in the system as has been true of prior arrangements. In addition, if a minor leak should occur in the system, it is obvious that this leak will have little effect on the operability of the system.

With reference to FIGS. 1 and 2, while the source 76 has been described as being one which supplies constant pressure, it similarly may consist of one which supplies a constant volume of pressure fluid. In this instance, the valve springs which normally urge the valve members 24 and 26 toward closed positions are designed such as to permit equal flow of fluid therepast when the control handle 28 is in its neutral position. Thus, when the handle 28 is rocked in one direction, one of the valve springs 42, 44 will be relaxed while the other is increased in force against the respective valve member. There thus results more flow past one valve member than the other resulting further in a differential pressure being developed over the valve spool of the control valve 12. By using a constant volume source 76, a pressure change in each of the lines 80 and 82 may be obtained when the control handle 28 is operated. This means that a somewhat lower pressure for the source 76 would be required in order to obtain the necessary movement of the control valve 12 than would be required when the source 76 is operated such as to provide a constant pressure of liquid irrespective of the volume of flow.

When the source 76 is of the constant pressure type, an alternative embodiment of the invention may be considered as residing in the fact that the two plungers 34 and 36 need not be connected to a common operating handle 28 as shown in FIG. 1 but may instead be individually operated. In other words, the handle 28 may be regarded as being removed with the two actuating members 34 and 38 being controlled manually. In this instance, if it is desired to move the control valve 12 in one direction, the corresponding plunger 34, 36 is lifted slightly while the other plunger is held in its neutral position. For moving the control valve in the opposite direction, the other plunger 34, 36 is lifted slightly while holding the remaining plunger in its neutral position. Fluid flow through the valve assemblies remains the same as earlier described in connection with FIGS. 1 and 2.

While I have described above the principles of my invention in connection with specific apparatus, it is to be clearly understood that this description is made only by way of example and not as a limitation to the scope of my invention.

What is claimed is:

1. In a hydraulic control system, first and second valve assemblies mounted on a common supporting frame; each valve assembly comprising a tubular element secured to said frame, said element having opposite ends, one of said ends providing a valve seat, an elongated actuating member reciprocably mounted on said frame for movement between two opposite positions and a neutral portion therebetween and having an elongated socket which movably telescopes over said tubular element, a valve member sealingly engageable with said valve seat and disposed in said socket, a first helical compression spring in said socket which bears at one end against said valve member urging it onto said seat with a predetermined force, the other end of said spring bearing against an abutment in said socket, two spaced-apart retaining members surrounding said actuating member and being movable with respect thereto, said retaining members being engageable with oppositely spaced portions of said frame, a second helical spring surrounding said actuating member and being compressed between said retaining members thereby urging them into engagement with said frame, two spaced apart abutments on said actuating member operatively engageable with the opposite outermost sides of said retaining members, respectively, whereby axial movement of said actuating member in one direction moves one of said retaining members therewith and opposite axial movement thereof moves the other of said retaining members therewith; a handle mounted on said frame for movement in two directions from a neutral position, means connecting said handle to the two actuating members of said first and second valve assemblies for axial reciprocation of said actuating members in opposite directions when said handle is moved; a fluid pressure responsive device movable between two opposite positions and a neutral position therebetween, first and second fluid motor means for selectively moving said device between said opposite positions, respectively; a source of fluid under pressure, first conduit means connecting said source to the other end of one of said tubular elements, means connecting said first conduit means to said first fluid motor means, second conduit means connecting said source to the other end of the other of said tubular elements, means connecting said second conduit means to said second fluid motor means, and fluid flow-restricting means in both said first and second conduit means, the connection of said first and second fluid motor means to said first and second conduit means, respectively, being at a location between said flow-restricting means and said tubular elements, respectively.

2. In a hydraulic control system, first and second valve assemblies mounted on a common supporting frame; each valve assembly comprising a tubular element secured to said frame, said element having opposite ends, one of said ends providing a valve seat, an elongated actuating member reciprocably mounted on said frame for movement between two opposite positions and a neutral position therebetween and having an elongated socket which movably telescopes over said tubular element, a valve member sealingly engageable with said valve seat and disposed in said socket, a first helical compression spring in said socket which bears at one end against said valve member urging it onto said seat with a predetermined force, the other end of said spring bearing against an abutment in said socket, two spaced apart retaining members surrounding said actuating member and being movable with respect thereto, said retaining members being engageable with oppositely spaced portions of said frame, a second helical spring surrounding said actuating member and being compressed between said retaining members thereby urging them into engagement with said frame, two spaced apart abutments on said actuating member operatively engageable with the opposite outermost sides of said retaining members, respectively, whereby axial movement of said actuating member in one direction moves one of said retaining members therewith and opposite axial movement thereof moves the other of said retaining members therewith; a lever pivotally mounted intermediate its ends on said frame, the opposite ends of said lever having respective force-transmitting connections to the two actuating members of said valve assemblies whereby pivotal movement of said lever moves said actuating members oppositely, a fluid pressure responsive device movable between two opposite positions and a neutral position therebetween, first and second fluid motor means for selectively moving said device between said opposite positions, respectively; a source of fluid under pressure, first conduit means connecting said source to the other end of one of said tubular elements, means connecting said first conduit means to said first fluid motor means, second conduit means connecting said source to the other end of the other of said tubular elements, means connecting said second conduit means to said second fluid motor means, and fluid flow-restricting means in both said first and second conduit means, the connection of said first and second fluid motor means to said first and second conduit means, respectively, being at a location between said flow-restricting means and said tubular elements, respectively.

3. The hydraulic control system of claim 1 wherein said frame is a closed chamber and said valve assemblies are contained therein, said handle including a shaft mounted for axial reciprocation on a support, said support being carried by said reservoir, a valve body on said support having a passage therethrough, said passage having opposite ends and a valve seat therebetween, a valve member on one end of said shaft and movable into and out of engagement with the last-mentioned valve seat in response to reciprocation of said shaft, and a conduit connected between one end of said passage and said reservoir.

4. The hydraulic control system of claim 1 wherein said frame is a closed chamber and said valve assemblies are contained therein, said handle including a shaft mounted for axial reciprocation on a support, said support being carried by said reservoir, a valve body on said support having a passage therethrough, said passage having opposite ends and a valve seat therebetween, a valve member on one end of said shaft and movable into and out of enagement with the last-mentioned valve seat in response to reciprocation of said shaft, a conduit connected between one end of said passage and said reservoir, and a dead man's lever pivotally mounted on said shaft and having an arm operatively engageable with said support whereby swinging movement of said dead man's lever axially moves the last-mentioned valve member out of engagement with its valve seat.

5. In a hydraulic control system, first and second valve assemblies mounted on a common supporting frame; each valve assembly comprising a tubular element secured to said frame, said element having opposite ends, one of said ends providing a valve seat, an elongated actuating member reciprocably mounted on said frame for movement between two opposite positions and a neutral position therebetween and having an elongated socket which movably telescopes over said tubular element, a valve member sealingly engageable with said valve seat and disposed in said socket, a first helical compression spring which bears at one end against said valve member urging it onto said seat with a predetermined force, the other end of said spring bearing against an abutment in said socket, two spaced apart retaining members surrounding said actuating member and being movable with respect thereto, said retaining members being engageable with oppositely spaced portions of said frame, a second helical spring surrounding said actuating member and being compressed between said retaining members thereby urging them into engagement with said frame, two spaced apart abutments on said actuating member operatively engageable with the opposite outermost sides of said retaining members, respectively, whereby axial movement of said actuating member in one direction moves one of said retaining members therewith and opposite axial movement thereof moves the other of said retaining members therewith; a handle mounted on said frame for movement in two directions from a neutral position, and means connecting said handle to the two actuating members of said first and second valve assemblies for axial reciprocation of said actuating members in opposite directions when said handle is moved.

6. In a hydraulic control system, first and second valve assemblies mounted on a common supporting frame; each valve assembly comprising a tubular element secured to said frame, said element having opposite ends, one of said ends providing a valve seat, an elongated actuating member reciprocably mounted on said frame for movement between two opposite positions and a neutral position therebetween and having an elongated socket which movably telescopes over said tubular element, a valve member sealingly engageable with said valve seat and disposed in said socket, a first helical compression spring in said socket which bears at one end against said valve member urging it onto said seat with a predetermined force, the other end of said spring bearing against an abutment in said socket, two spaced apart retaining members surrounding said actuating member and being movable with respect thereto, said retaining members being engageable with oppositely spaced portions of said frame, a second helical spring surrounding said actuating member and being compressed between said retaining members thereby urging them into engagement with said frame, two spaced apart abutments on said actuating member operatively engageable with the opposite outermost sides of said retaining members, respectively, whereby axial movement of said actuating member in one direction moves one of said retaining members therewith and opposite axial movement thereof moves the other of said retaining members therewith, a lever pivotally mounted intermediate its ends on said frame, the opposite ends of said lever having respective force-transmitting connections to the two actuating members of said valve assemblies whereby pivotal movement of said lever moves said actuating members oppositely.

7. In a hydraulic control system, first and second valve assemblies mounted on a common supporting frame; each valve assembly comprising a tubular element secured to said frame, said element having opposite ends, one of said ends providing a valve seat, an elongated actuating member reciprocably mounted on said frame for movement between two opposite positions and a neutral position therebetween and having an elongated socket which movably telescopes over said tubular element, a valve member sealingly engageable with said valve seat and disposed in said socket, a first helical compression spring in said socket which bears at one end against said valve member urging it onto said seat with a predetermined force, the other end of said spring bearing against an abutment in said socket, two spaced apart retaining members surrounding said actuating member and being movable with respect thereto, said retaining members being engageable with oppositely spaced portions of said frame, a second helical spring surrounding said actuating member and being compressed between said retaining members thereby urging them into engagement with said frame, two spaced apart abutments on said actuating member operatively engageable with the opposite outermost sides of said retaining members, respectively, whereby axial movement of said actuating member in one direction moves one of said retaining members therewith and opposite axial movement thereof moves the other of said retaining members therewith; said first helical springs urging the respective valve members into engagement with the respective seats throughout the extent of movement of said actuating members.

8. The hydraulic control system of claim 6 but including three pair of said valve assemblies, and means for moving the actuating members of each pair oppositely.

9. In a hydraulic control system, first and second valve assemblies mounted on a common supporting frame; each valve assembly comprising a tubular element secured to said frame, said element having opposite ends, one of said ends providing a valve seat, an elongated actuating member reciprocably mounted on said frame for movement between two opposite positions and a neutral position therebetween and having an elongated socket which movably telescopes over said tubular element, a valve member sealingly engageable with said valve seat and disposed in said socket, a first helical compression spring in said socket which bears at one end against said valve member urging it onto said seat with a predetermined force, the other end of said spring bearing against an abutment in said socket, two spaced apart retaining members surrounding said actuating member and being movable with respect thereto, said retaining members being engageable with oppositely spaced portions of said frame, a second helical spring surrounding said actuating member and being compressed between said retaining members thereby urging them into engagement with said frame, two spaced apart abutments on said actuating member operatively engageable with the opposite outermost sides of said retaining members, respectively, whereby axial movement of said actuating member in one direction moves one of said retaining members therewith and opposite axial movement thereof moves the other of said retaining members therewith; a supporting member having opposite side portions, a pair of parallel spaced apart elongated links pivotally connected at the opposite ends thereof to said side portions and said frame, respectively, a shaft rotatably mounted on said supporting member and having two oppositely laterally extending arms thereon, and a pair of struts connected between said arms and the two actuating members of said valve assemblies, respectively, whereby rotation of said shaft moves said actuating members oppositely.

10. The hydraulic control system of claim 6 but including three pairs of said valve assemblies on said frame, said valve assemblies being arranged substantially parallel and laterally spaced apart, a supporting member having opposite side portions, a pair of parallel spaced apart elongated links pivotally connected at the opposite ends thereof to said side portions and said frame, respectively, a shaft rotatably mounted on said supporting member and having two oppositely laterally extending arms thereon, a first pair of struts connected between said arms and the two actuating members, respectively, of one pair of valve assemblies whereby rotation of said shaft moves the last-mentioned actuating members oppositely, a second pair of struts pivotally connected at one end to said supporting member on opposite sides respectively of one of said links, the other ends of said second pair of struts being connected to the two actuating members of a second pair of valve assemblies whereby pivotal movement of said supporting member on said links moves the last-mentioned actuating members oppositely, and a transverse bar secured intermediate its ends to one of said links, the opposite ends of said bar being operatively connected to the two actuating members of the third pair of valve assemblies whereby pivotal movement of said links on said frame moves the last-mentioned actuating members oppositely.

References Cited in the file of this patent

UNITED STATES PATENTS

| | | |
|---|---|---|
| 1,305,964 | Dickson | June 3, 1919 |
| 1,890,041 | McLeod | Dec. 6, 1932 |
| 2,742,922 | Frellsen | Apr. 24, 1936 |
| 2,398,421 | Frische | Apr. 16, 1946 |
| 2,725,890 | Kanuch | Dec. 6, 1955 |
| 2,949,741 | Troche | Aug. 23, 1960 |
| 2,995,116 | Dobbins | Aug. 8, 1961 |
| 3,073,347 | Bent | Jan. 15, 1963 |
| 3,082,788 | Quayle | Mar. 26, 1963 |

FOREIGN PATENTS

| | | |
|---|---|---|
| 458,280 | Canada | July 26, 1949 |